UNITED STATES PATENT OFFICE 2,606,838

EMULSIFIED ICE CREAM COMPOSITION

Emery I. Valko, Mountain Lakes, N. J., assignor to E. F. Drew & Co., Inc., New York, N. Y., a corporation of Delaware No Drawing. Application November 16, 1949, Serial No. 127,763

5 Claims. (Cl. 99—136)

The invention is directed to edible compositions, more particularly to ice cream and ice cream mixes having a modifying agent incorporated therein.

It has become customary in the prior art to provide the usual mixes for ice cream and adding thereto a constituent in the making of an emulsifying agent in order to develop more favorable characteristics in the ice cream. Such characteristics included the formation of fine ice crystals, the obtaining of better texture and controlling the amount of overrun. The substance added to give such properties was usually a mono or diglyceride of a higher fatty acid. Among such compounds were the diglycerides of stearic acid and the monoglycerides of saturated and unsaturated fatty acids such as palmitic, stearic, oleic, linoleic or the like.

It was considered necessary in such addition agents that there be present an unesterified hydroxy group attached to the glyceride radical. In some cases, in place of the glyceride, the mono-esters of dipropylene glycol were suggested. In all cases the effectiveness of the addition agent or emulsifier was due primarily to the presence of said free hydroxy group.

While such substances perform the desired improvement to some extent, they had a number of disadvantages. The addition agents did not have a desirable taste or odor and if a considerable amount thereof were added to the ice cream, the palatability thereof was likely to be injured. In order to obtain a sufficient effect from the addition agent, substantial quantities thereof were added, namely from $\frac{1}{10}$% to 1%, or even more.

The present invention is intended and adapted to overcome the difficulties and disadvantages inherent in products of the character described, it being among the objects of the present invention to provide an ice cream mix containing one or more of a series of compounds of organic nature which do not depend on or contain free hydroxy groups attached to alcohol radicals and which provide adequate improved properties in the ice cream.

It is also among the objects of the present invention to provide an ice cream mix containing an addition agent which is substantially free from deleterious or undesirable taste or odor and which does not adversely effect the palatability of the ice cream.

It is further among the objects of the present invention to provide an ice cream mix having the aforesaid addition agent in an amount much smaller than had heretofore been used in the prior art and having an effectiveness far greater than that of the free hydroxy containing emulsifiers previously used.

In practicing the present invention, there is provided an ice cream mix of the usual character, the following being typical of mixtures ordinarily used.

| | Parts by weight |
|---|---|
| Milk | 11 |
| Cream | 5 |
| Sugar | 3 |
| Milk powder | 1 |

To an ice cream mix of any suitable character, there is incorporated one or more of a series of compounds which are diesters of a high molecular weight polyethylene glycol with one or more fatty acids. The fatty acid may be a higher fatty acid having at least 10 carbon atoms and up to the highest fatty acid found in vegetable and animal oils, usually having 22 or 24 carbon atoms. The diester may contain two such higher fatty acid radicals or may contain one such radical, the other radical being that of a lower fatty acid having from 2 to 4 carbon atoms. These acids are acetic, propionic and butyric. Where two fatty acids are utilized to form the diesters, it is not necessary that such acids be in equimolecular proportions, although this is desirable. If they are not in such proportions, then there will be present in the composition diesters of a single acid as well as mixed diesters. In the esters contemplated herein, the products are substantially free from unesterified OH radicals. The higher fatty acids used may be saturated or unsaturated or may be mixtures thereof.

The polyethylene glycols utilized in the manufacture of the addition agents have a molecular weight of at least 300. Better results are obtained with higher molecular weight polyethylene glycols and usually it is preferred that these glycols have molecular weights between 400 and 1000. However, molecular weights as high as 4000 give good results. In general, the molecular weight of the polyethylene glycol is such that there are from 5 to 60 ethylene glycol radicals in the molecule.

The amount of the diester which is added to the ice cream mix is extremely small and is not over .01% by weight of the mix. As little as 0.01% has been found to give satisfactory results. In most cases, optimum effects are obtained by using 0.05% of the addition agent or emulsifier.

The following are specific examples of the operation of the invention:

Example 1

The starting material is polyethylene glycol having an approximate molecular weight of 1540, consisting of approximately 35 ethylene glycol radicals. 685 grams, equal to ½ mol. of the glycol, is mixed with 125 grams of a mixture of higher fatty acids consisting essentially of stearic and lauric acids in approximately equimolecular proportions, being about ½ mol.

The mixture is placed in a closed vessel connected to a vacuum pump and it is heated gradually to a temperature of 225° C. with continuous agitation and with the introduction of a flow of nitrogen to act as a blanket in the vessel. The vacuum is increased during the heating cycle so that when the temperature has reached 225° C. in about six hours, the pressure is from 5 to 10 mm. absolute. At such temperature, heating is continued and the vacuum is maintained until the free fatty acid number has dropped below 4. Water is removed continuously during the operation and upon completion of the reaction, the product is allowed to cool to about 135° C.

Thereupon there is added to the reaction product, which is substantially the polyglycol monostearate, 60 grams of acetic anhydride (98%), equivalent to slightly over ½ mol. Heating is resumed and continued until the temperature has reached 200° to 210° C. A reflux condenser is provided so as to condense the vaporized acetic anhydride, which is returned for further reaction. The refluxing is continued for about one hour, or until substantially complete esterification with the acetic anhydride has taken place.

The resulting product is then usually treated to remove any residual acetic anhydride and acetic acid present by means of steam or vacuum with heat. The resulting product may be filtered to remove suspended matter and cooled to room temperature. The diester so formed is a waxy solid, soluble in vegetable and animal oils and fats and has a melting point of 38° to 40° C.

To the above described ice cream mix there is added 0.05% by weight of said mix of the above described product. It is incorporated therein in any suitable manner and preferably during the making of the mix. Since the addition product has good flavor and a slight but pleasant odor, the palatability of the ice cream is improved to some extent. The creamy quality of the ice cream is substantially improved and the ice cream is substantially smoother to the taste than that made with the prior art emulsifying agent in greater quantities than the present products.

Example 2

140 grams of oleic acid, equivalent to ½ mol., are placed in a suitable reaction vessel. About ½% of sodium hydroxide in 50% aqueous solution is added to the oleic acid to act as a catalyst in the reaction. The oleic acid is heated to 160° C., and ethylene oxide is bubbled into the reaction vessel under the surface of the liquid, preferably with continual stirring, but without any vacuum or pressure. The rate of addition is such that the ethylene oxide is fully absorbed. This is continued until about 255 grams of ethylene oxide has been introduced. The reactions which take place include the formation of a polymerized ethylene glycol, and at the end of the operation, the polyethylene glycol formed has a molecular weight of about 600 and is equivalent to ½ mol. At the same time under the temperature conditions, the mono-oleate of the polyethylene glycol has been formed.

There is then added to the product about 80 grams of propionic anhydride and esterification is caused to take place similarly to the second step of Example 1. The resulting product may be steam refined and filtered, giving the propionic-oleic neutral ester of polyethylene glycol 600.

The reaction product or emulsifying agent is added to any suitable ice cream mix in quantities not over 0.1%. The highly desirable properties mentioned above are imparted to the ice cream.

Example 3

One molecular weight of polyethylene glycol having an average molecular weight of about 1000 is mixed with two molecular weights of technical stearic acid containing a small amount of other higher fatty acids such as palmitic and oleic.

The mixture is heated in a suitable closed vessel under a vacuum and the temperature is gradually raised to 225° C. with continuous agitation and with a blanket of an inert gas. The vacuum is gradually increased during the operation until the pressure is not over 5 to 10 mm. absolute. Water is removed continuously during the operation, which is conducted to a point where the free fatty acid number is 10 or less. The product is utilized as described above.

Although the invention has been described setting forth two specific embodiments thereof, such illustrations were intended to designate the character of the invention and not to limit the same as various changes in details may be made within the spirit thereof. For instance, the conditions of the operation in the manufacture of the emulsifying agents may be varied at will and other methods for producing the same may be used. The polyethylene glycols of various molecular weights need not have any exact or invariable molecular weights but the average molecular weight should be 300 and preferably higher. It is not necessary that the fatty acids used be cured but such acids may contain other fatty acids in large or small proportion. For instance, the lauric acid described in Example 1 may be technical lauric acid containing small amounts of adjacent fatty acids found in coconut type oils. The lower fatty acids may likewise be or contain mixtures of the several acids mentioned herein.

These and other changes may be made within the principles herein set forth and the invention is to be broadly construed except as limited by the claims appended hereto.

I claim:

1. An ice cream mix containing milk, cream and sugar, having incorporated therein the diester of a polyethylene glycol having a molecular weight of 300 to 4000 with a higher fatty acid having at least 10 carbon atoms and a fatty acid having 2 to 4 carbon atoms.

2. An ice cream mix containing milk, cream and sugar, having incorporated therein the diester of a polyethylene glycol having a molecular weight of 300 to 4000 with a higher fatty acid having at least 10 carbon atoms and a fatty acid having 2 to 4 carbon atoms, the amount of said ester being from 0.01% to 0.1% by weight of said mix.

3. An ice cream mix containing milk, cream and sugar, having incorporated therein the diester of a polyethylene glycol having a molecular weight of about 600–1500 with an equimolecular mixture of a higher fatty acid having at least 10 carbon atoms, said fatty acid being essentially lauric acid, and acetic acid, the ester being substantially neutral.

4. An ice cream mix containing milk, cream and sugar, having incorporated therein the diester of a polyethylene glycol having a molecular weight of about 600–1500 with an equimolecular mixture of a higher fatty acid having at least 10 carbon atoms, said fatty acid being essentially lauric acid, and acetic acid, the amount of said ester being from 0.01% to 0.1% by weight of said mix.

5. An ice cream mix containing milk, cream and sugar, having incorporated therein the diester of a polyethylene glycol having a molecular weight of about 600–1500 with an equimolecular mixture of a higher fatty acid having at least 10 carbon atoms, said fatty acid being essentially lauric acid, and acetic acid, the amount of said ester being about 0.05% by weight of said mix.

EMERY I. VALKO.

REFERENCES CITED

The following references are of record in the file of this patent:

UNITED STATES PATENTS

| Number | Name | Date |
|---|---|---|
| 2,065,398 | Roth et al. | Dec. 22, 1936 |
| 2,398,950 | Moore | Apr. 23, 1946 |
| 2,474,019 | Steiner et al. | June 21, 1949 |